(12) United States Patent
Wallace

(10) Patent No.: US 10,776,726 B2
(45) Date of Patent: Sep. 15, 2020

(54) COMPUTER APPLICATION FOR THE GATHERING AND INTERPRETATION OF DATA FROM INTERVAL SMART METERS

(76) Inventor: McHenry Wallace, Crystal Beach, TX (US)

( * ) Notice: Subject to any disclaimer, the term of this patent is extended or adjusted under 35 U.S.C. 154(b) by 34 days.

(21) Appl. No.: 12/699,267

(22) Filed: Feb. 3, 2010

(65) Prior Publication Data

US 2010/0191488 A1 Jul. 29, 2010

Related U.S. Application Data

(60) Provisional application No. 61/208,324, filed on Feb. 23, 2009.

(51) Int. Cl.
*G06Q 10/06* (2012.01)

(52) U.S. Cl.
CPC .................... *G06Q 10/06* (2013.01)

(58) Field of Classification Search
CPC ....................................... G06Q 10/06
USPC ............ 702/33, 57, 60, 61, 62, 64; 700/275, 700/276, 278, 291, 299
See application file for complete search history.

(56) References Cited

U.S. PATENT DOCUMENTS

| | | | |
|---|---|---|---|
| 8,078,330 B2 * | 12/2011 | Brickfield et al. | 700/291 |
| 2004/0024483 A1 * | 2/2004 | Holcombe | G06Q 30/02 700/122 |
| 2005/0096797 A1 * | 5/2005 | Matsubara et al. | 700/291 |
| 2006/0065750 A1 * | 3/2006 | Fairless | F23N 5/203 236/46 R |
| 2009/0088991 A1 * | 4/2009 | Brzezowski | G01D 4/00 702/62 |
| 2009/0228406 A1 * | 9/2009 | Lopez et al. | 705/412 |
| 2010/0070102 A1 * | 3/2010 | Benes et al. | 700/296 |
| 2010/0219983 A1 * | 9/2010 | Peleg et al. | 340/870.17 |
| 2011/0015798 A1 * | 1/2011 | Golden et al. | 700/291 |
| 2011/0022242 A1 * | 1/2011 | Bukhin | G06Q 10/06 700/291 |
| 2011/0040785 A1 * | 2/2011 | Steenberg et al. | 707/769 |
| 2011/0153103 A1 * | 6/2011 | Brown et al. | 700/291 |

* cited by examiner

*Primary Examiner* — Ricky Ngon

(57) ABSTRACT

A computer implemented method for energy management in a building by taking information on energy usages of a metered building and matching the energy usage to calculated energy usages for electrical devices.

1 Claim, 8 Drawing Sheets

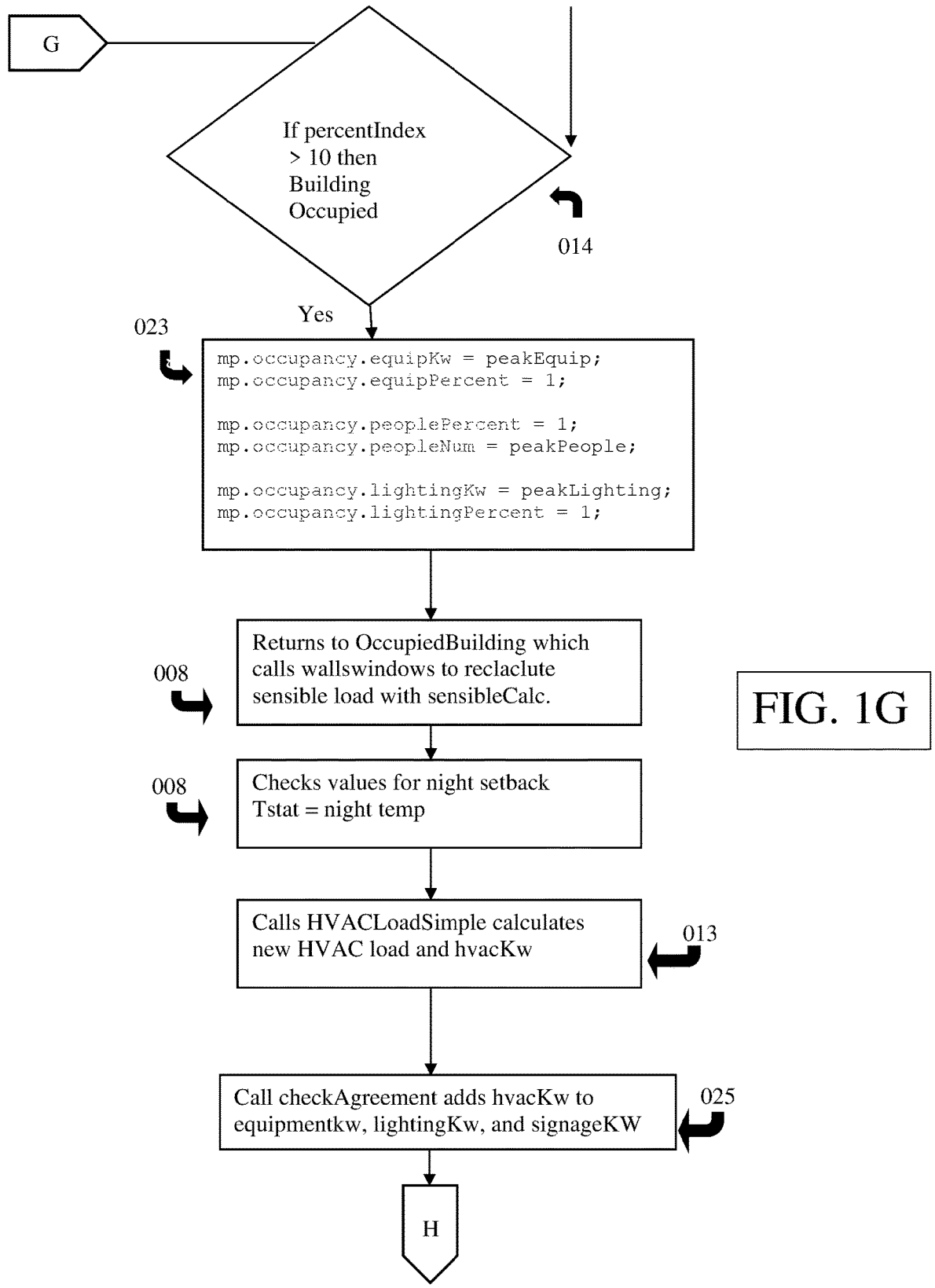

COMPUTER APPLICATION FOR THE GATHERING AND INTERPRETATION OF DATA FROM INTERVAL SMART METERS

CROSS-REFERENCE TO RELATED APPLICATIONS

This application claims the benefit of provisional patent application No. 61/208,324, filed Feb. 23, 2009 by the present inventor.

STATEMENT REGARDING FEDERALLY SPONSORED RESEARCH

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

This invention relates to computer programs, specifically a program for the gathering and interpretation of data on energy usage from a building meter.

2. Description of the Prior Art

Growing concern over energy conservation has given rise to an industry of energy management. One of the most important tools for energy management is the ability to track energy usage in a structure. Prior to this invention, one could only receive from a whole building meter a figure representing the total electrical usage over a timer period. This information was of limited usefulness because, while it may allow a user to see that the structure's electrical usage was outside of an ideal range, it does not provide specific information to allow a diagnosis of the problem. The growing importance of energy management has given rise to the need to develop better tools.

BRIEF SUMMARY OF THE INVENTION

The object of the present invention is to provide a software tool to allow information on energy usages to be converted to information more useful for energy management. Specifically, the software is able to take the information on energy usages of a metered building and other information, such as square footage of a building, sun angles and temperatures, and is able to match the energy usage to calculated energy usages for electrical devices. This information is used to tell specifically what devices are being used at what time and for how long. For example, when do the lights turn on and how long are they on? Using this information, it is possible to calculate energy usage by devices and to use this information to more efficiently manage energy in the facility. The examples given in this summary are purely demonstrative and should not be taken as limitations to the application.

BRIEF DESCRIPTION OF THE SEVERAL VIEWS OF THE DRAWING

FIG. 1A-1H is a simplified flowchart of an embodiment of the present invention. This flowchart details the type of data that is inputted into the system and how that data is manipulated by the system. The diagram is merely an illustration and should not limit the scope of the claims herein. One of ordinary skill in the art could recognize other variations, modifications, and alternatives.

DETAILED DESCRIPTION OF THE INVENTION

This program was created using the JAVA programming language and runs on a Windows operating system, but is compatible with Linux systems.

Figure 1A:
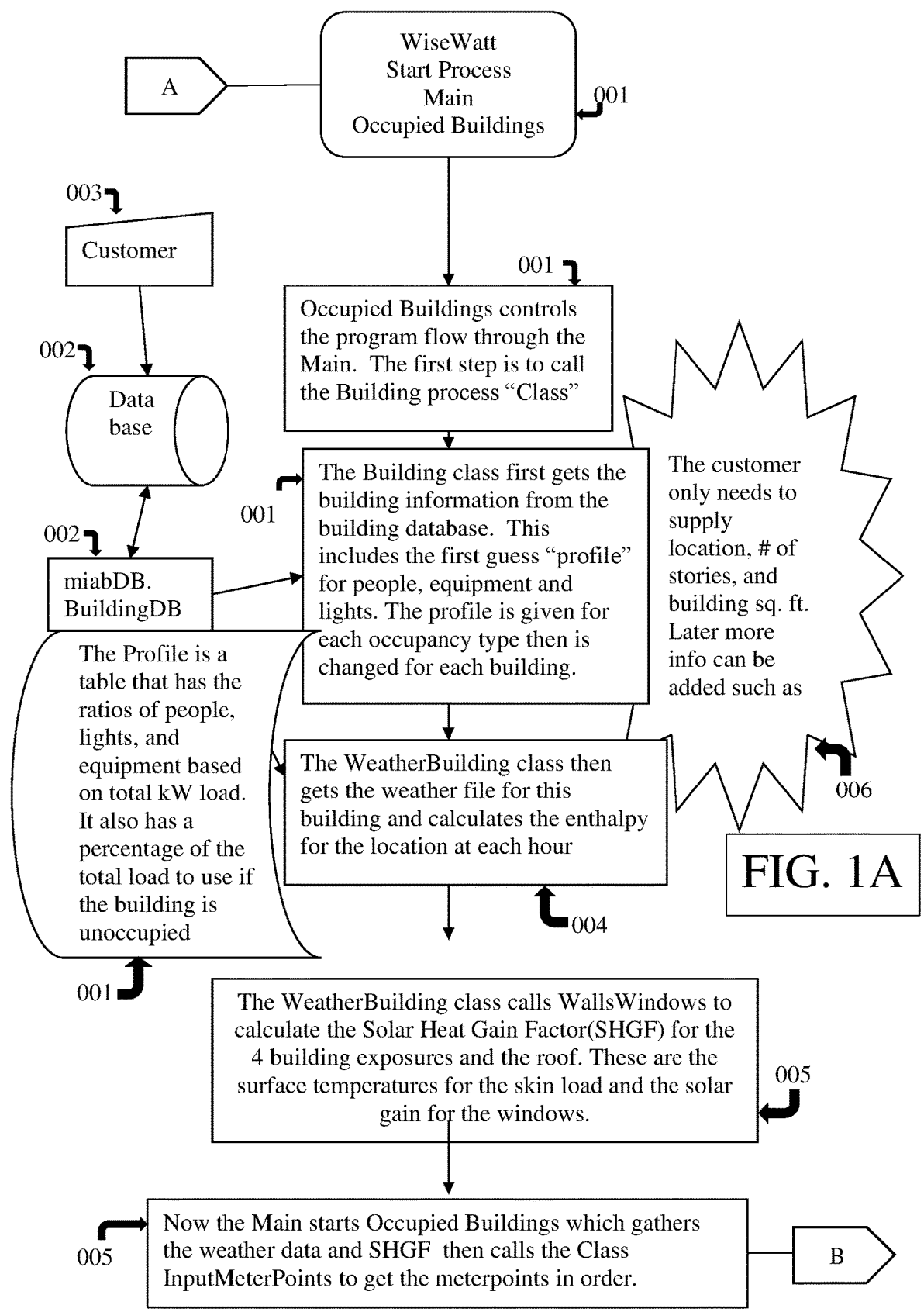

FIG. 1A describes the use of information on building size and location, occupancy type, and type of HVAC equipment 001 as stored in a data base 002. At a time interval, the energy meter read is provided in a flat file 003. The weather for that location is downloaded 004 for that time period and the software generates the breakdown of power use by building loads 005. The sum of these loads must exactly match the meter readings.

FIG. 1A begins by stating that the customer only needs to supply the location, number of stories, building square footage, and occupancy type 006. One of ordinary skill in the art could recognize that this is a large reduction in the information required to be gathered to develop energy savings measures.

Figure 1B:
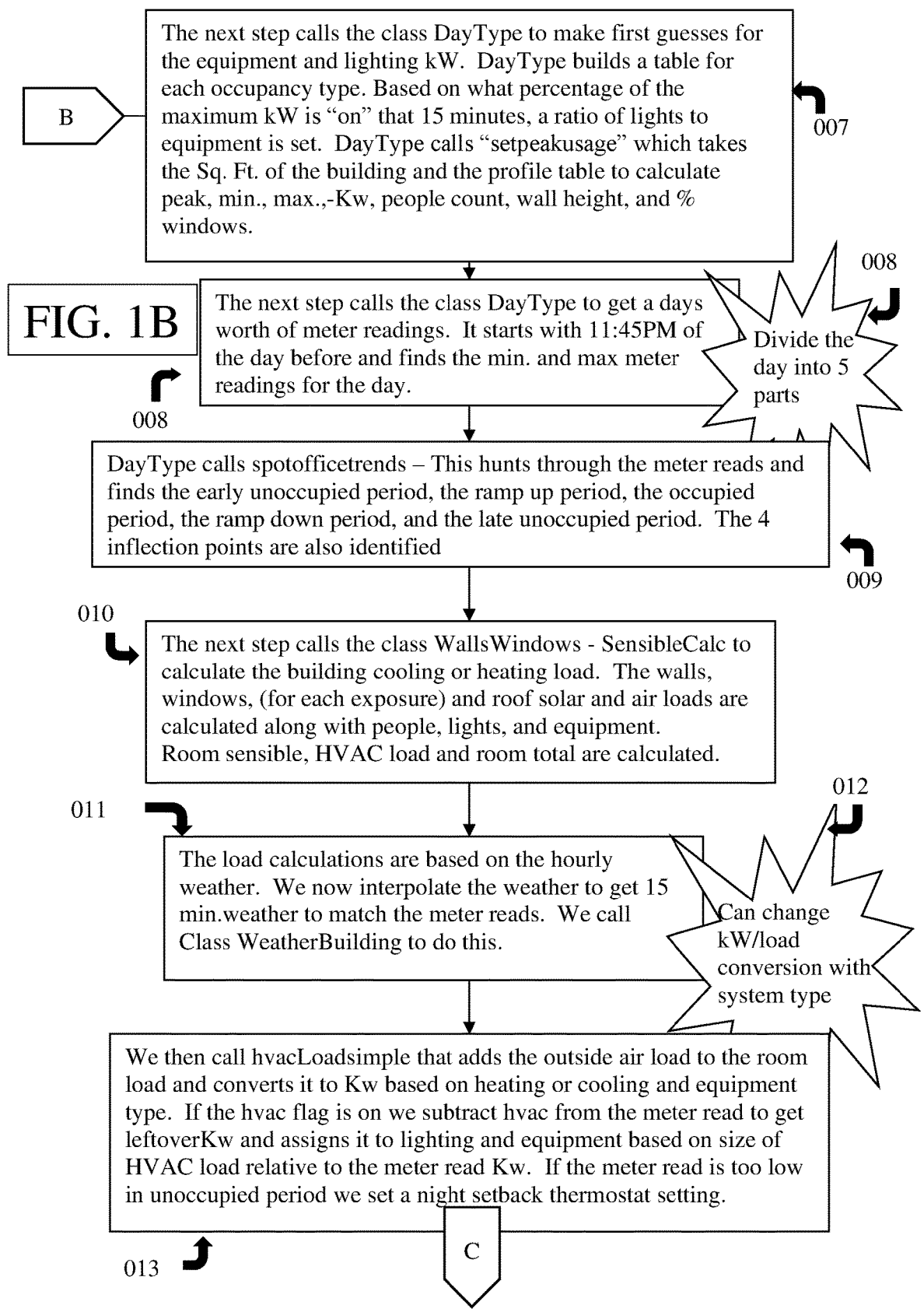

FIG. 1B describes that the Day Type program calculates people count, wall height, and % windows 007. These are not given values gathered during an audit, but calculated values. The physical size and building components are varied by the invention.

FIG. 1B describes the concept of dividing the day into 5 parts 008 by finding the 4 inflection parts is introduced. The unconventional part of this procedure that advances the state of the art is that the program identifies the inflection points based on the change in energy use between meter reading intervals. Previously an industry standard building curve might be used to compare to a buildings actual energy use. This invention lets the building describe it's own energy curve based on it's actual energy use.

FIG. 1B The 5 parts of the day are listed as the early unoccupied period, the ramp up period, the occupied period, the ramp down period, and the late unoccupied period 009. This is a key part of the new invention, by recognizing that the building operates differently in each of these time periods and utilizing different procedures in each of these time periods 010 the invention is able to advance the current state of the art. In the early unoccupied and late unoccupied periods 011 the weather depended and 24 hour energy users are more easily identified. In the ramp and ramp down periods the large loads are identified 012 as changes in energy seen during the intervals between meter readings. The same loads can be identified as starting in the ramp up period and stopping in the ramp down period 013. The occupied period has very small changes in the energy use 014. The weather dependent HVAC energy use can be clearly identified.

Figure 1C:
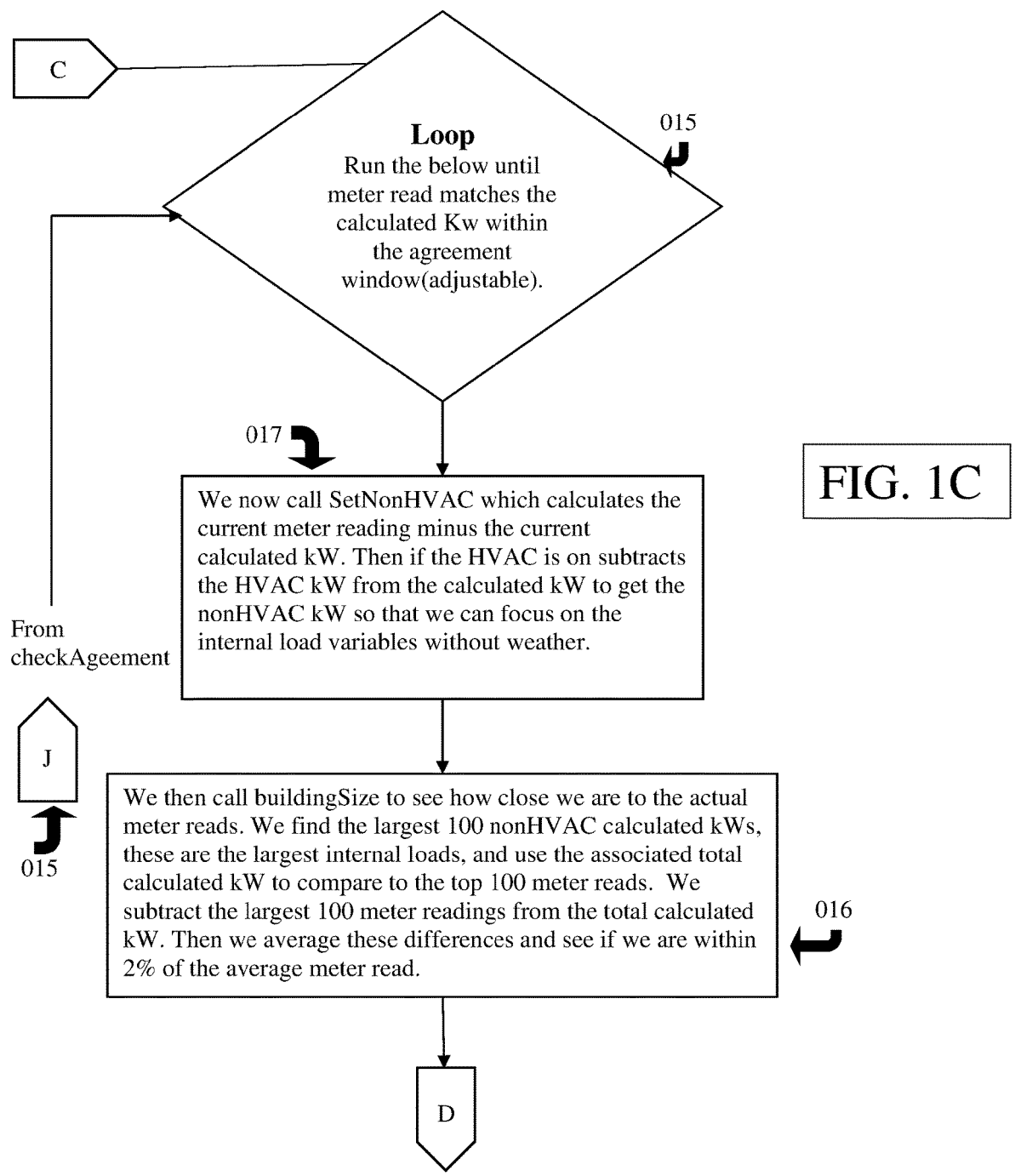
Figure 1D:
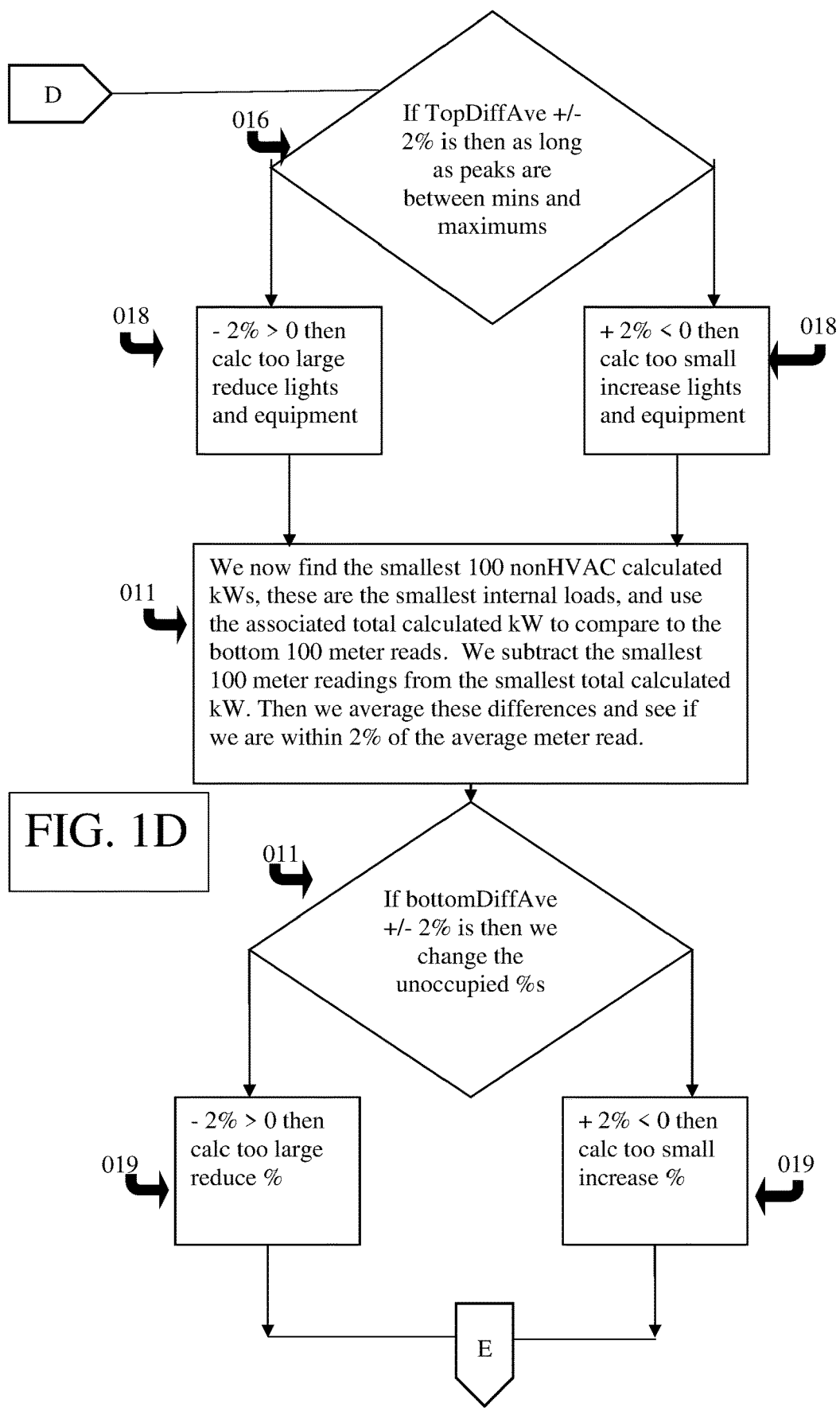

FIG. 1C then continues to describe the iterations 015 that are used to exactly match 016 the breakdown of energy use 017 in the building to the meter readings. On FIG. 1D the key variables are changed in each new iteration 018. The people count, the lighting that is on, the equipment that is on, the percentage of windows in the building, and the wall heights are modified 019, continuing on FIG. 1E, to match the calculated building use to the actual meter reading for each 15 minute interval.

Figure 1E:
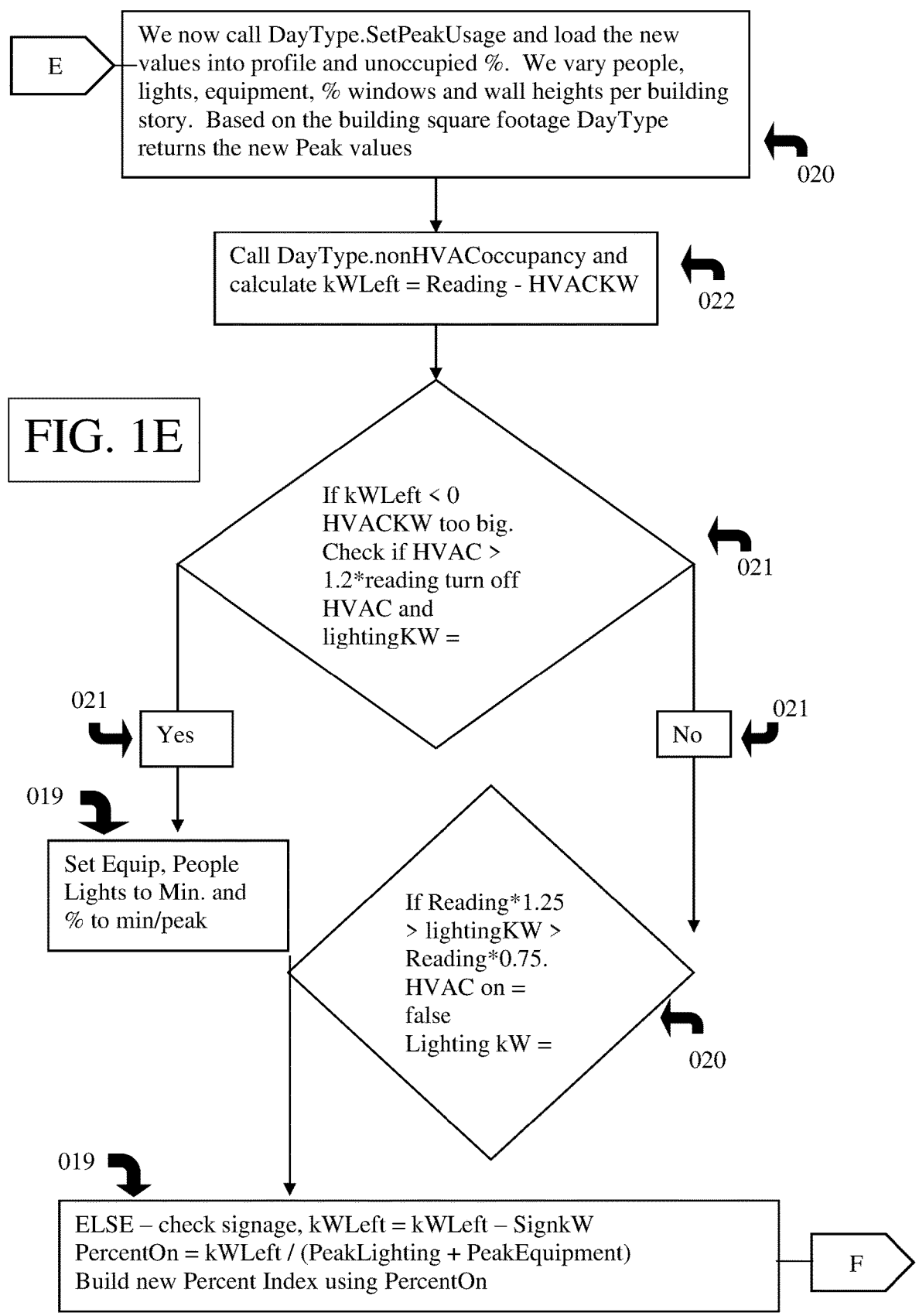
Figure 1F:
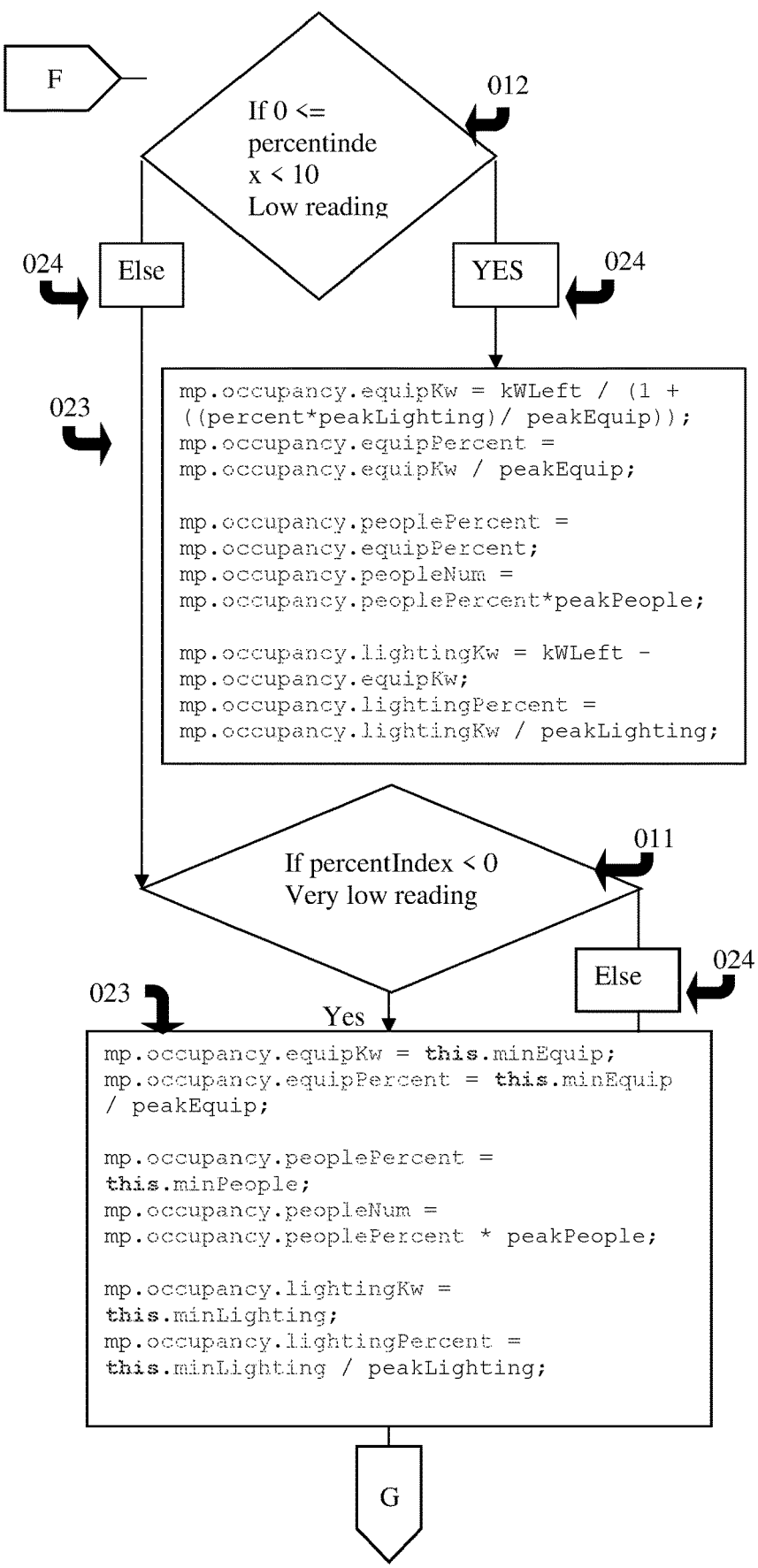

FIG. 1E describes another key advancement of this invention that is not common to the current state of the art is the "nesting" of the HVAC energy use calculation with the other energy users in the building 020. As the people count, the lighting that is on, the equipment that is on, the percentage of windows in the building, and the wall heights are modified 021 they change the HVAC load that is dependent on these variables. As shown on FIG. 1E the HVAC load is recalculated in each iteration and then if the actual energy used does not match the meter reading 021 the HVAC energy is subtracted out 022. In FIG. 1F and FIG. 1G the remaining energy is proportioned over the other variables 023 in the next iteration until the actual energy use exactly matches the meter reading 024. These proportionments are tested by the effects they have on the HVAC load in this new iteration 025. All the energy uses including the HVAC must sum to the total meter reading each interval.

Figure 1H:
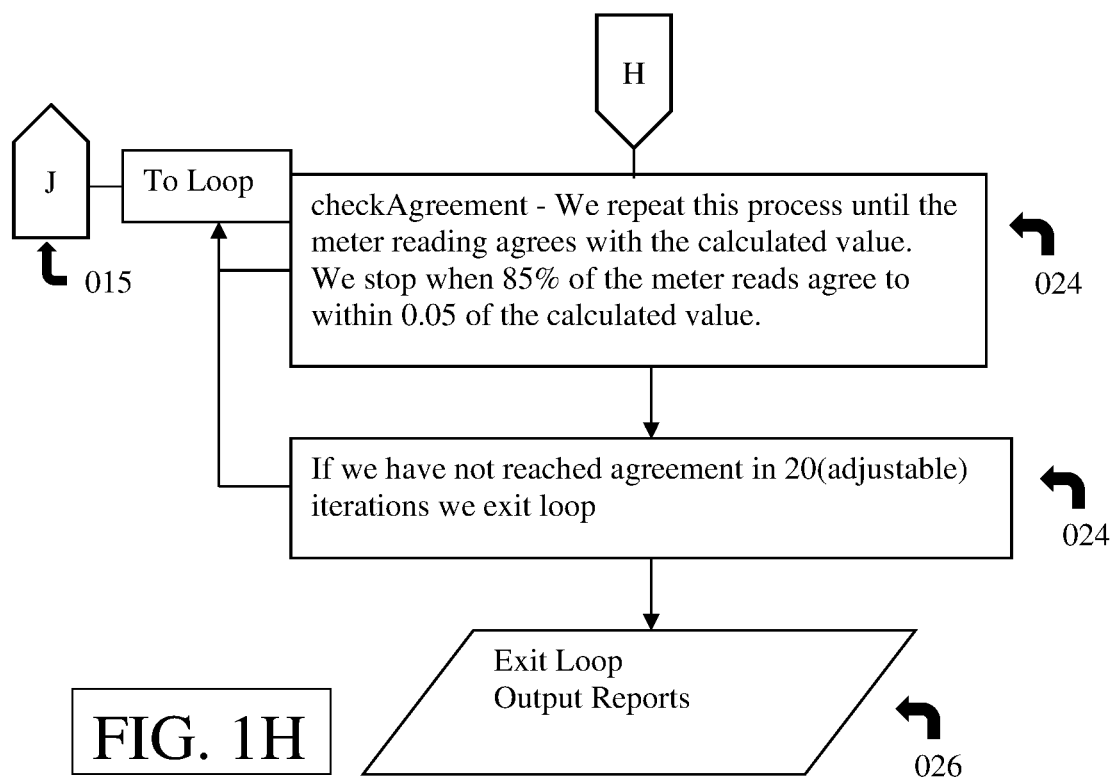

In FIG. 1H the flow chart concludes with output reports 026. These reports are based on the calculated breakdown of energy use that when summed (FIG. 1G 025) exactly matches (FIG. 1H 024) the energy used in that meter interval. Using the 5 daily time periods 008 the energy use is divided into, different real life energy savings measures are offered in the reports. Some examples are the unoccupied energy use might be too high, the ramp up might start too early, the KW/ton HVAC use could be too high. The lighting left on all night might be too much. An economizer used on the HVAC during periods when the outside air temperature is below the return air temperature would reduce energy use, the use of night setback thermostats would reduce energy use.

Accordingly in conclusion, the reader will see that this program allows an unprecedented level of information on energy usage through information gathered from energy meters. This information is directly applicable to the field of energy management and represents a marked advance in the ability of an energy management expert to monitor energy usage.

Since certain changes may be made in the forging disclosure without departing from the scope of the invention herein involved, it is intended that all matters contained in the above description be construed in an illustrative and not a limiting sense.

The invention claimed is:

1. A monitoring system for exactly matching a calculated change in energy use over time in a building to a projected energy use from a plurality of electrical devices in the monitoring system, the monitoring system comprising:

a computer processor;

an electrical meter associated with the building, in communication with the computer processor, and adapted to receive electrical readings associated with the plurality of electrical devices;

a software tool adapted for execution on the computer processor, the software tool performing:

generating a building class, the building class comprising a profile describing a physical size, a structure and a use of the building;

modifying the profile describing the physical size, the structure, and the use of the building to create a virtual representation of the building used for exactly matching the calculated change in energy use over time in the building to the projected energy use from the plurality of electrical devices;

calculating the change in energy use over time in the building and the projected energy use for the plurality of electrical devices over a same time interval as the received electrical readings from the electrical meter; said same time interval being one of several distinct daily time intervals based upon the size, the structure and the use of the building;

recalling the calculated change in energy use over time in the building and the projected energy use for the plurality of electrical device based upon the profile describing the physical size, the structure, and the use of the building and the virtual representation of the building;

exactly matching the calculated change in energy use over time in the building to the projected energy use from the plurality of electrical devices based upon the profile describing the physical size, the structure, and the use of the building and the virtual representation of the building; and generating a report having the matched calculated change in energy use over time in the building and the projected energy use from the plurality of electrical devices as actionable energy reduction measures, whereby said report includes energy savings measures for reducing energy use in one of the plurality of electrical devices and recommending a specific time interval of usage for each of the plurality of electrical devices associated with the building based upon the matched energy uses.

* * * * *